United States Patent Office 3,685,965
Patented Aug. 22, 1972

3,685,965
REDOX PRECIPITATION OF NONFER-
ROUS HEAVY METALS FROM AQUEOUS
SOLUTION
Elmar Kniprath, Hamburg, Germany, assignor to
Norddeutsche Affinerie
No Drawing. Filed Dec. 1, 1969, Ser. No. 881,295
Claims priority, application Germany, Dec. 3, 1968,
P 18 12 332.5
Int. Cl. C01g 45/02, 49/02, 51/04
U.S. Cl. 423—605        9 Claims

ABSTRACT OF THE DISCLOSURE

Metals such as manganese and cobalt are precipitated from aqueous solution in the form of their higher valence hydroxides, hydrated oxides or oxides by introducing into the solution free-oxygen and a reducing agent, especially sulfur dioxide or a sulfite, while maintaining the pH of the solution between the precipitation pH of the lower valence and that of the higher valence precipitate.

PREAMBLE

Iron can be oxidized with $O_2$ or air in a weakly acid medium, whereas Mn and Co can be precipitated with only very strong oxidizing agents, e.g. $Cl_2$. It is an object of the invention to eliminate this drawback and, in addition, to accelerate the precipitation of such metals from leaches or solutions.

Among other applications, processes of this type are of industrial importance in hydrometallurgy, e.g. for the purification of nickel electrolytes, such as those obtained in electrolytic copper refining or speiss treatment, by removing iron, manganese, cobalt and/or other metals dissolved therein.

THIS INVENTION

According to the present invention, heavy metals having at least one lower and one higher valence state, are precipitated from aqueous solutions of salts thereof in the form of their higher valence hydroxides, hydrated oxides, or oxides, e.g. for the purification of electrolytes in hydrometallurgy, by means of oxidation thereof in a pH range situated between the precipitation pH of the respectively lower-valence and that of the respectively higher-valence metallic hydroxide, hydrated oxide, or oxide. Oxygen or a free-oxygen-containing gas, e.g. air, is added to the solution along with a reducing agent, in particular, (1) sulfur dioxide, a free-sulfur dioxide-containing gas or (2) a sulfite or hydrogen sulfite solution, with the reducing agent being added to the solution at a rate corresponding to its rate of consumption.

It is surprising, particularly in the case of the nonferrous metals, that this precipitation can be effected through single oxidation by means of oxygen in an acid medium. While it is possible to precipitate iron without the addition of a reducing agent, the adding, in accordance with the invention, of such a reducing agent results in substantial acceleration of the reaction.

It is important that at no time during the course of the reaction should there be a substantial excess of reducing agent and the reducing agent should be added at a rate, whether continuously or incrementally, corresponding to its rate of consumption. If added intermittently, the temporary excess of the reducing agent should be kept within such limits that reduction of the precipitated higher-valence metallic compounds will not occur. When highly concentrated solutions of the metal ions are treated, it is appropriate to remove the precipitate continuously from the solution.

An advantageous increase in the reaction velocity can be brought about by having the reaction occur at temperatures above room temperature, e.g. from 25° to 75° C.

The reaction can be accelerated through intensive stirring of the solution during precipitation. An acceleration is also obtained if the gas used as the oxidizing agent, e.g. air, is introduced in finely divided form, e.g. through a series of small orifices or a foraminous plate. The use of a gas agitator or stirrer is advantageous. This embodiment is particularly suited for a continuous process.

Preferably the pH that is maintained is in the acid range and depends on the concentration of the solution and the type of the metal to be precipitated. For instance, in the precipitating of manganese or cobalt, a pH value of about 5 proved to be particularly effective.

The control of the pH is preferably achieved by adding alkali or alkaline earth hydroxide, carbonate and/or bicarbonate.

EXAMPLES

Example 1

Into a solution maintained at 50° C. of 2 g. Mn (as sulfate) in 1 liter of water, $O_2$ (25 liter/hr.) and $SO_2$ (1 liter/hr.) were introduced with stirring. Caustic soda solution was added to maintain pH at 5.0. After about 2 hours, the Mn had quantitatively precipitated as hydrated manganese dioxide.

Example 2

To a solution of 25 g. Mn (as sulfate) in 1 liter of water there was slowly added, accompanied by stirring, a sodium sulfite solution (approximately 125 g. $Na_2SO_3$/liter) while simultaneously adding $O_2$ (25 liter/hr.), at 50° C. Caustic soda solution was added to maintain the pH at 5.0. The precipitated hydrated manganese dioxide was removed continuously from the solution by filter with the filtrate being returned to the main solution. After 4 hours, all of the manganese had precipitated.

Example 3

Air (14 m.$^3$/hr.) and $SO_2$ (38 liter/hr.) were introduced into 500 liters, at about 50° C., of a nickel electrolyte (80 g. Ni/liter, 100 mg. Mn/liter) with stirring. A chalk suspension was also slowly added to maintain the pH around 5.0. All of the manganese was precipitated after about 2 hours.

Example 4

With all other conditions remaining identical to those set forth in Example 3, air was introduced by means of a rapidly rotating gas agitator. Within 5 minutes all of the manganese had precipitated. This embodiment is particularly suited for a continuous process.

Example 5

Into a solution, at 50° C., of 5 g. Co (as sulfate) in 1 liter of water there were introduced, accompanied by stirrings, $O_2$ (25 liter/hr.) and $SO_2$ (2.4 liter/hr.). Caustic soda solution was added to maintain the pH at 5.0. After 2–2½ hours all of the cobalt had precipitated as CoOOH.

I claim:

1. In a process of precipitating the ion of a heavy metal capable of existing in higher and lower valence states from an aqueous solution thereof as a precipitate in the form of the higher-valence hydroxide, hydrated oxide or oxide of said metal ion by oxidation thereof in a pH of the range situated between the precipitation pH of the lower-valence and that of the higher-valence metallic hydroxide, hydrated oxide or oxide, said heavy metals being selected from the group consisting of manganese, cobalt, iron and nickel, the improvement comprising the introduction of free-oxygen into said solution in the presence of a reducing agent added to said solution, with the rate of addition of said reducing agent corresponding to the rate of consumption thereof.

2. The process of claim 1 wherein said reducing agent is selected from the group consisting of sulfur dioxide, sulfite and hydrogen sulfite, and said metal is a non-ferrous metal having at least a lower valence state and a higher valence state.

3. The process according to claim 1 wherein said precipitate is removed continuously from the solution during the reaction.

4. The process according to claim 1 wherein said solution is well agitated and is maintained at a temperature in the range of 25° C. to 75° C. and said pH range is maintained by adding to said solution a compound selected from the group consisting of alkali and alkaline earth hydroxides, carbonates and hydrogen carbonates.

5. The process according to claim 1 wherein said free-oxygen is added in the form of air which is introduced into the solution by means of a gas agitator.

6. A process of precipitating a metal ion selected from the group consisting of manganese and cobalt from an aqueous solution thereof, comprising:
(a) adjusting and maintaining the temperature of said solution at a temperature in the range of 25° C. to 75° C. and the pH thereof in the range between the precipitation pHs of the lower valence and the high valence hydroxide, hydrated oxide or oxide of said metal;
(b) adding to said solution a reducing agent selected from the group consisting of sulfur dioxide and sodium sulfite, at a rate corresponding to the rate of consumption of said reducing agent;
(c) passing free-oxygen through said solution simultaneously with said reducing agent; and
(d) recovering as a precipitate a compound selected from the group consisting of the hydroxide or oxide of said metal ion.

7. The process of claim 6 wherein said pH is maintained by the addition to said solution of a compound selected from the group consisting of sodium hydroxide and calcium carbonate.

8. The process of claim 7 wherein said solution is well agitated, and said precipitate is continuously removed therefrom.

9. The process of claim 8 wherein said pH is about 5.

References Cited

UNITED STATES PATENTS 2,530,616   11/1950   Kingsbury et al. _____ 23—145
2,600,456   6/1952   Wyman et al. _____ 23—145

OSCAR R. VERTIZ, Primary Examiner

H. S. MILLER, Assistant Examiner

U.S. Cl. X.R.
423—633